United States Patent [19]

Morrell et al.

[11] 3,859,476

[45] Jan. 7, 1975

[54] TWO POSITION MOUNTING FOR TELEPHONE SETS

[75] Inventors: Ronald Joseph Morrell; Graham Sterling Laing; Bev William Gumb, all of London, Ontario, Canada

[73] Assignee: Northern Electric Company Limited, Montreal, Canada

[22] Filed: Aug. 16, 1973

[21] Appl. No.: 389,016

[52] U.S. Cl. .......... 179/100 C, 179/146 R, 179/178

[51] Int. Cl. .......... H04m 1/04

[58] Field of Search ........ 179/100 R, 100 C, 100 D, 179/100 L, 146 R, 147 R, 178, 179; 248/223, 224, 309

[56] References Cited

UNITED STATES PATENTS

| | | | |
|---|---|---|---|
| 1,981,649 | 11/1934 | King | 179/100 R |
| 2,868,888 | 1/1959 | Bender | 179/100 D |
| 2,878,324 | 3/1959 | Guerrero | 179/146 R |
| 3,470,330 | 9/1969 | Brown | 179/146 R |
| 3,480,741 | 11/1969 | Wiggins | 179/146 R |
| 3,602,565 | 8/1971 | England, Jr. | 179/146 R |
| 3,715,519 | 2/1973 | O'Leary | 179/100 C |
| 3,800,089 | 3/1974 | Reddick | 179/179 |

*Primary Examiner*—William C. Cooper
*Assistant Examiner*—Randall P. Myers
*Attorney, Agent, or Firm*—Sidney J. Jelly

[57] ABSTRACT

A telephone set can be desk mounted or wall mounted by the provision of a bracket which adapts the telephone set for wall mounting. The bracket can be attached to the wall and the telephone set fastened to the bracket, or the bracket can first be attached to the telephone set and then fastened to the wall. In both instances the telephone set can readily be removed from and reattached to the bracket when installed.

6 Claims, 8 Drawing Figures

TWO POSITION MOUNTING FOR TELEPHONE SETS

This invention relates to two position mountings for telephone sets, and in particular is concerned with the alternate mounting of a telephone set by positioning on a desk or similar substantially horizontal surface and by mounting on a wall or similar vertical, or substantially, vertical surface.

At the present time it is usual to provide alternate forms of telephone set for desk mounting and wall mounting. This increases stock requirements and also service personnel have to carry the alternate forms of telephone set. If for any reason the customer wishes to change from one form to another the telephone set has to be changed.

The present invention provides an arrangement in which a telephone set can be used for either purpose —desk or wall mounting— by the use of a wall bracket which adapts the telephone set for the wall mounting. The telephone set can be quickly and easily attached and removed from the bracket after the bracket has been attached to the wall.

A further feature of the invention is concerned with the lead or cable to the telephone set. In normal telephone sets the cord usually has to be passed through a hole in the wall or special arrangements must be made to connect the cord in such a manner that it does not interfere with the fixing of the telephone set. It is a feature of the present invention that the supply cord or cable is fed through a slot formed in the base of the telephone set and secured by clamping means which permit pivotting of the cord or cable. By this means the cord can be run backwards from the telephone set when it is positioned on a desk —or table— without interfering with the telephone set, and can be run down the wall when the telephone set is mounted on the wall —again without interfering with the telephone set. The cord can also be passed through a hole in the wall, or in the desk or table, if desired.

The invention will be readily understood by the following description of one embodiment, by way of example, in conjunction with the accompanying drawings, in which.

Figure 1:
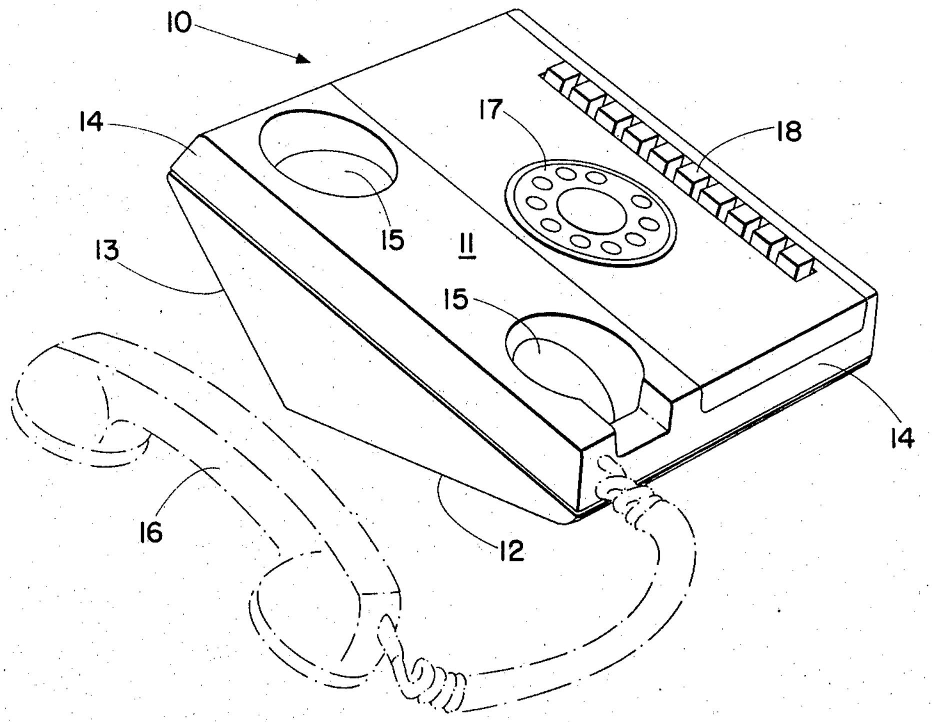
FIG. 1 is a perspective view of a telephone set.
Figure 2:
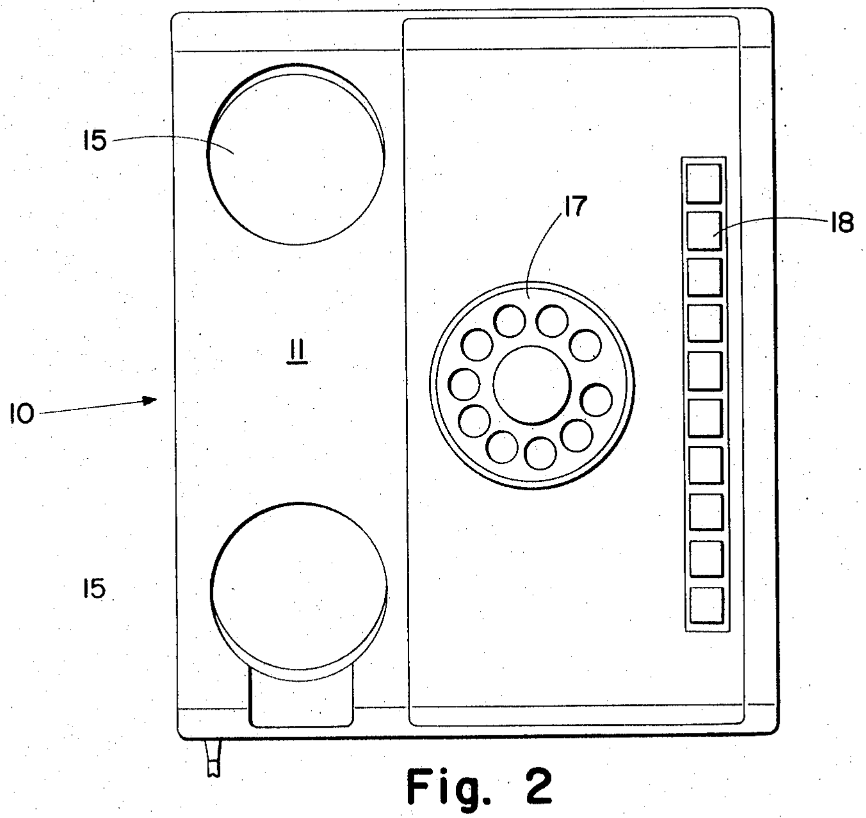
FIG. 2 is a top view of the telephone set of FIG. 1.

The telephone set illustrated in FIGS. 1 and 2, indicated generally at 10, has a somewhat triangular cross-section, viewed from the side. The longest side of the cross section forms the top or front face 11, and the cross-section is completed by two base surfaces 12 and 13, subtending an obtuse angle, surface 12 being what can be termed the forward base surface and surface 13 being the rearward base surface. Between the top face 11 and the base surfaces 12 and 13 are short surfaces 14.

Formed in the front face 11 are two recesses 15 for holding the handset 16. A dial 17 projects through the front face and also a row of pushbuttons 18.

Figure 3:
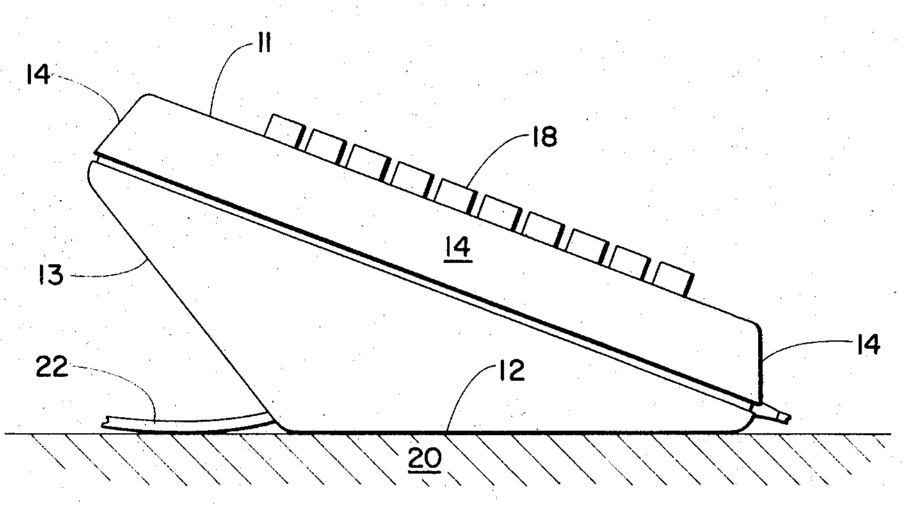
FIG. 3 is a side view of the telephone set of FIGS. 1 and 2 positioned on a desk or similar surface.
Figure 4:
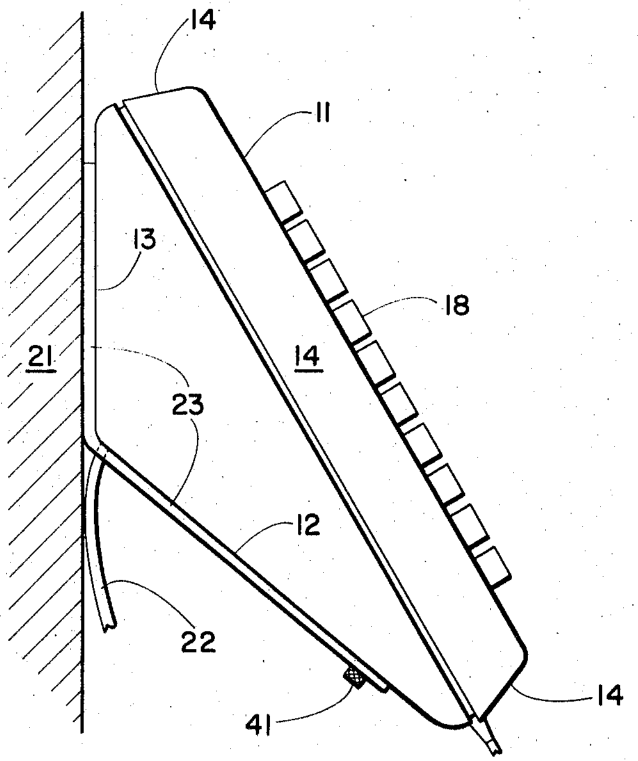
FIG. 4 is a side view of the telephone set of FIGS. 1 and 2 positioned on a wall or similar surface.

The cross-section is readily seen in FIGS. 3 and 4. These figures also illustrate a telephone set in the two alternative installation positions. FIG. 3 showing the set positioned on a table or desk or similar surface 20, and FIG. 4 showing the set on a wall, or similar surface 21. It will be seen that when resting on a table surface as in FIG. 3 the telephone set rests on the forward base surface 12. The front face 11 faces upward and slightly forward —in a direction convenient for a user. The connecting cord or cable 22 is led away rearwards.

For positioning on a substantially vertical surface, such as the wall 21, FIG. 4, the telephone set has its rearward surface 13 adjacent the wall surface. This presents the front face 11 with a more forward facing direction than when on a desk or table —more convenient for users. To attach the telephone set to the wall a bracket 23 is used. Bracket 23 is fastened to the wall and the telephone set 10 is then attached to the bracket 23. As an alternative the bracket can be attached to the telephone first and then bracket and telephone fastened to the wall. As seen in FIG. 4, the cord or cable 22 is led away downwards.

Figure 5:
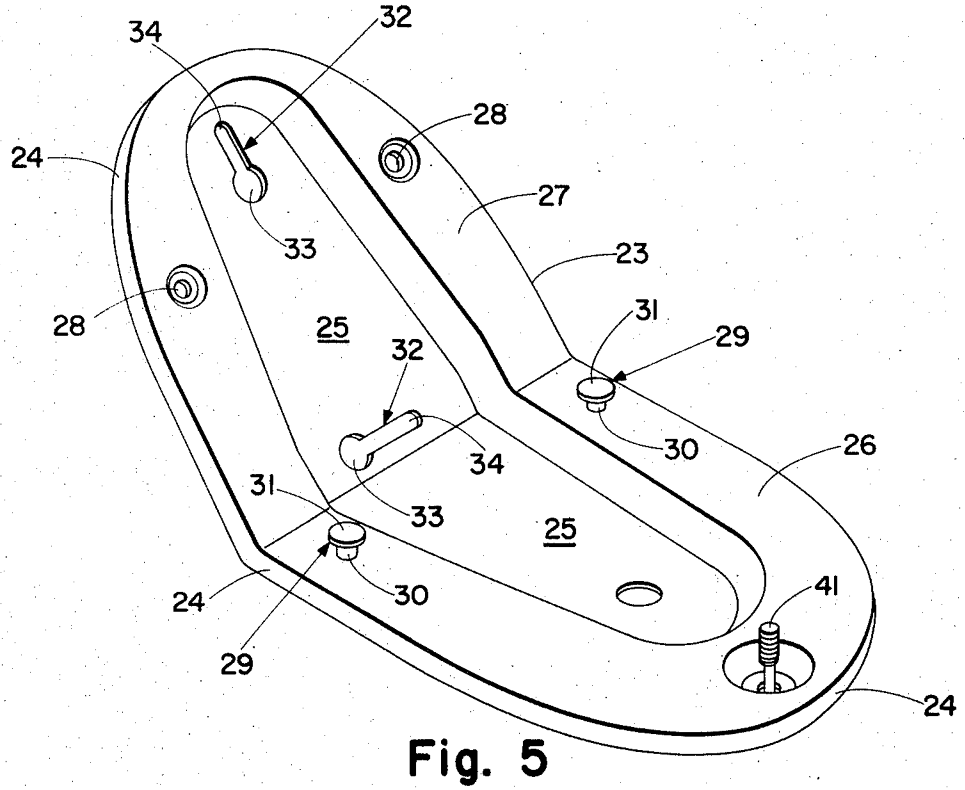
FIG. 5 is a perspective view of a bracket for attachment to a wall or similar surface when mounting a telephone set as in FIG. 4.

FIG. 5 shows a bracket in more detail. Conveniently the bracket is in the form of a steel pressing, or stamping. It has a rim 24 and a recessed center portion 25. It is bent slightly off-center to give two sections 26 and 27. Section 26 is intended to contact the forward base surface 12 of the telephone set and section 27 intended to contact the rearward base surface 13. Two holes 28 are provided by means of which the bracket can be permanently attached to the wall by screws or similar fastening devices. The section 26 has two studs 29 rivetted thereto spaced slightly from the bend of the bracket. Each stud has a shank portion 30 and a head portion 31 somewhat larger than the shank. These studs are intended to fit in slots in the base of the telephone set as will be described later. The bracket also has slots 32 of keyhole form. These can be used as an alternative way of attaching the bracket to a wall. A screw can be screwed into the wall until the head of the screw is slightly proud of the wall surface. The bracket can then be attached by passing the screw head through the enlarged portion 33 of the one of the slots 32 and then the bracket moved sideways or downward as the case may be to cause the screw shank to move into the narrow portion 34 of the slot. It is possible to use both slots 32, first positioning the top slot over the screw head and moving the bracket down; then fitting the second slot over a screw head and rotating the bracket slightly.

Figure 6:
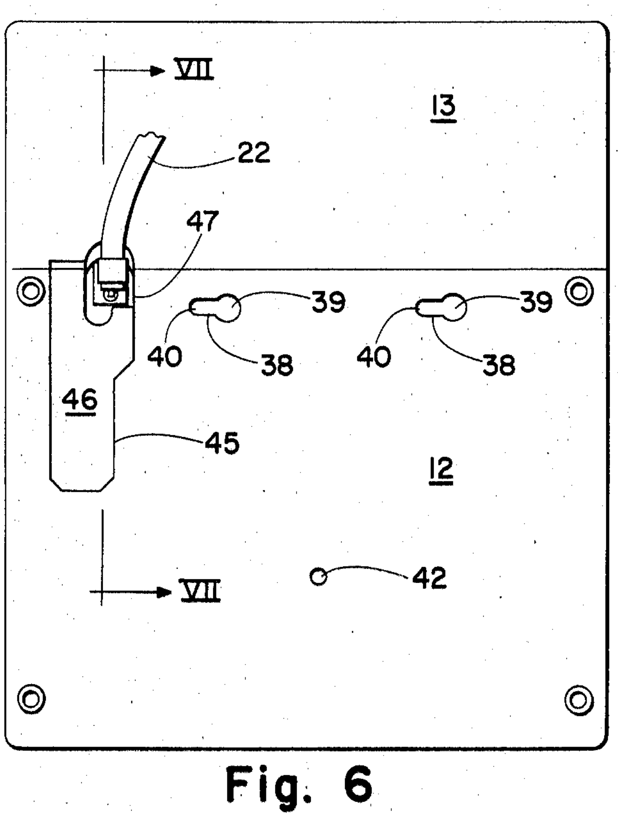
FIG. 6 is a view on the back of the telephone set of FIGS. 1 and 2.

FIG. 6 shows the base surfaces 12 and 13 of the telephone set 10. Formed in the forward base surface 12 are two slots 38 of keyhole form. The slots are a slight distance from the junction of the forward and rearward base surfaces 12 and 13 and positioned such that the studs 29 on the bracket 23 can enter into the slots. The head portions 31 of the studs pass through the enlarged portion 34 of each slot and then relative sideways movement of the bracket moves the shank portions 30 of the studs into the narrow portions 40 of each slot. If the bracket is attached to the wall first, as by screws through holes 28, the telephone set is attached to the bracket by moving the slots 38 into engagement with the studs 29. Alternatively the bracket is attached to the telephone set first by studs 29 and slot 38, the assembly then fastened to the wall by positioning one or both of the slots 32 in the bracket 23 over a screw or screws.

To finally tighten the bracket 23 into firm engagement with the telephone set, a captive screw 41 (FIGS. 4 and 5), held in the bracket 23, can be screwed into the threaded hole 42 in the base of the telephone set 10.

Also shown in FIG. 6 is the formation in the telephone set base through which passes the cord or cable 22 (FIGS. 3 and 4). The formation comprises two portions, a large aperture 45 which is closed after assembly of the cable to the set by an insert 56, and a smaller aperture 47. The large aperture is formed in the forward base surface 12 and permits easy assembly of the cord or cable. After the cable has been installed it is bent upward as seen in FIG. 6, and the insert 46 can be slid in. The cord or cable can move in the smaller aperture 47 depending upon the installation of the telephone set and the direction in which the cord or cable 22 is to be led.

As previously stated, the connecting cord or cable can be attached to the telephone set in a manner which permits altering the angle at which the cord or cable enters the telephone set housing. This is convenient in that the cord or cable can be moved to avoid interfering with positioning of the telephone set, whether on a vertical or horizontal surface.

Figure 7:
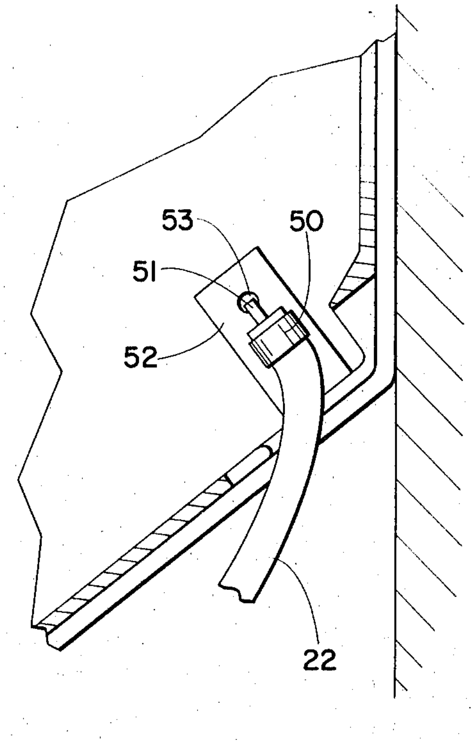
FIG. 7 is a cross-section on the line VII—VII of FIG. 6, with the connecting cord or cable in one position for wall mounting.
Figure 8:
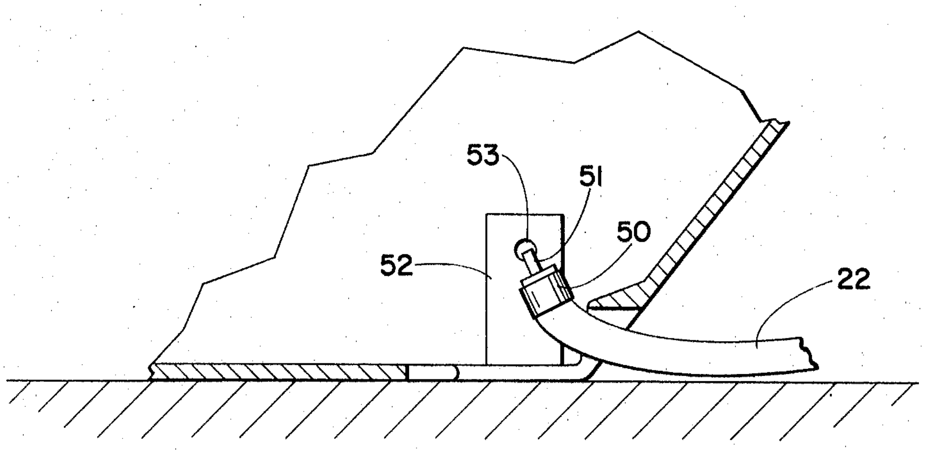
FIG. 8 is a similar view to that of FIG. 7 with the connecting cord or cable in the position for desk mounting.

FIG. 7 illustrates the arrangement when the telephone set is mounted on a wall, for example as in FIG. 4. The cord or cable 22 has a metal sleeve 50 securely clamped on the end. The sleeve 50 has a tag 51 extending therefrom. A cord retaining bracket 52 is attached to the base of the telephone set housing, the bracket having a hole 53 therein. The tag 51 of the sleeve 50 has a hooked or cranked form and is inserted into the hole 53. The cooperation of the tag 51 and hole 53 acts as a pivot, enabling the cord or cable 22 to be moved to different entry angles while still being retained in position and also preventing any strain on the conductors of the cord or cable. Thus, as seen in FIG. 8, when the telephone set is to be positioned on a desk or table, as in FIG. 3 for example, the cord or cable 22 can be moved —or pivotted— about the pivot formed by the tag 51 and hole 53 to enable the cord to extend rearwards. If desired the cord 22 can be brought out at an intermediate angle —for example if it was desired to feed the cord through a hole in the wall, when the telephone set is wall mounted. Thus the attachment of the cord or cable 22 is secure and yet is not dependent upon the installation position as the entry angle can be adapted to the particular needs of the installation.

The interengaging means comprising studs 29 and slots 38 can be varied. Thus the studs 39 could be on section 27 of the bracket and the slots 38 be formed in the rearward base surface 13. It is also possible to have the studs on the housing and the slots in the bracket, the studs serving as feet, if formed on the forward base surface 12, when the telephone set is resting on a horizontal surface.

Thus there is provided a mounting of a telephone set which is adaptable and enables one design or form of telephone set to be used for desk or wall mounting. This reduces stock requirements and also capital tied up in stocks. Only one type of telephone set need be carried by service personnel, whether for installation or repair purposes.

What is claimed is:

1. A telephone unit adapted for alternate mounting on a substantially horizontal surface and on a substantially vertical surface, said unit including a housing having a forward base surface and a rearward base surface, the forward base surface for positioning on said horizontal surface and the rearward base surface for positioning on said vertical surface, said forward base surface subtending an obtuse angle relative to said rearward base surface; a bracket adapted for positioning against said base surfaces and said vertical surface; and interengaging means on said bracket and said housing to retain said housing on said bracket; said interengaging means comprising studs on one of said housing and said bracket and slots in the other of said housing and said bracket, said studs including enlarged head portions for engagement in said slots; said bracket including means for attachment of said bracket to said vertical surface.

2. A telephone unit as claimed in claim 1, said studs formed on one section of said bracket and said slots formed in said housing.

3. A telephone unit as claimed in claim 2, said slots formed in the forward base surface of said housing.

4. A telephone unit as claimed in claim 3, including two of said slots in said housing, said slots of keyhole formation, the longitudinal axis of one slot normal to the longitudinal axis of the other slot.

5. A telephone unit as claimed in claim 3, including a captive screw in said bracket and a threaded hole in said housing, said captive screw adapted to be screwed into said threaded hole.

6. A telephone unit as claimed in claim 1, and including a cord for electrical connection of the telephone set, a sleeve clamped on an end of said cord, an elongate aperture in said housing at the junction of said base surfaces, the axis of said aperture in a plane passing through said forward base surface and said rearward base surface, a cord retaining bracket attached to said housing on an interior surface thereof adjacent said junction of said base surfaces, and means pivotally connecting said sleeve and said cord retaining bracket.

* * * * *